April 24, 1951 J. A. RUZGA 2,550,604

REEL

Filed March 22, 1947

INVENTOR
J. A. RUZGA
BY C. H. Manz
ATTORNEY

Patented Apr. 24, 1951 2,550,604

UNITED STATES PATENT OFFICE 2,550,604

REEL

Joseph A. Ruzga, Baltimore, Md., assignor to Western Electric Company, Incorporated, New York, N. Y., a corporation of New York Application March 22, 1947, Serial No. 736,530

1 Claim. (Cl. 242—124)

This invention relates to reels, and more particularly to reels for holding pads of metallic tapes while the tapes are annealed.

In the manufacture of coaxial cables, tapes of copper are sometimes formed into tubes over core units of such cables to form the outer conductors of the cables. In order to obtain the proper electrical characteristics of such outer conductors, it is essential that the copper tapes be uniform in thickness throughout their lengths, and this is often accomplished by rolling or drawing semi-finished tapes. However, such working of the tapes sets up permanent strains in the tapes, thereby decreasing the formability of the tapes. Hence, the tapes must be annealed to relieve these strains. In the past, there has been no suitable apparatus for handling pads of such tape while they are annealed without damaging the tapes and without a large degree of manual handling of the tapes and miscellaneous hoisting equipment.

An object of the invention is to provide new and improved reels.

A further object of the invention is to provide new and improved reels for holding a multitude of pads of copper tape to be annealed in spaced relationship thereon, to present as much surface area of the pads directly to annealing gases, and to facilitate handling of the pads.

A reel illustrating certain features of the invention includes an arbor, a wheel-like reel head fixed to one end of the arbor, and a second wheel-like reel head mounted detachably on and keyed to the other end of the arbor.

Figure 2:
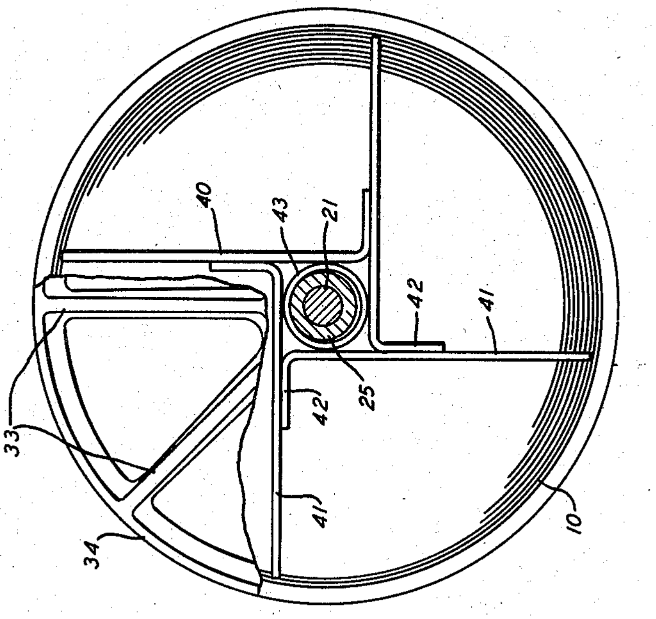
Figure 1:
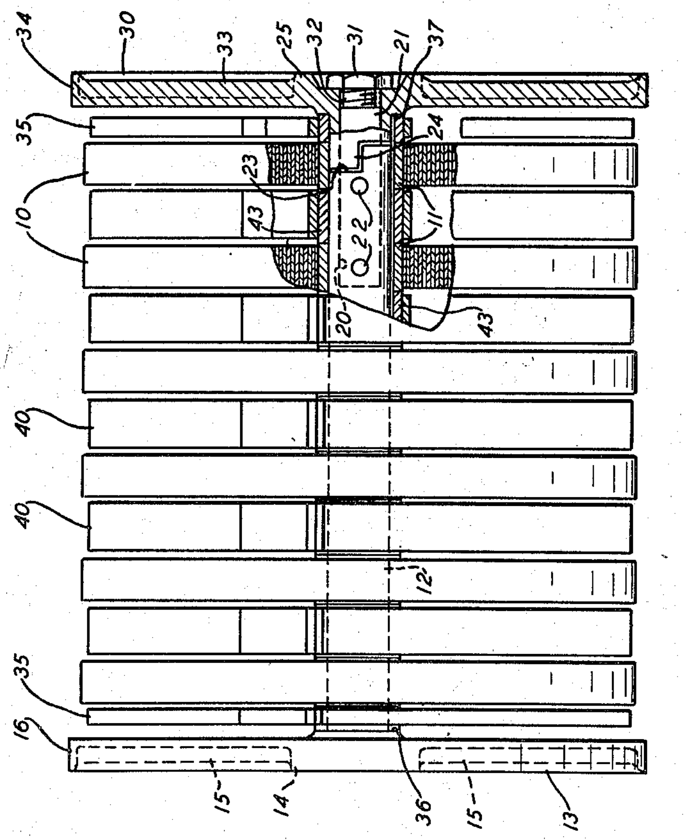

A complete understanding of the invention may be obtained from the following detailed description of a reel forming a specific embodiment thereof, when read in conjunction with the appended drawing, in which:

Fig. 1 is an elevation of a reel illustrating certain features of the invention with portions thereof broken away, and Fig. 2 is an end view of the reel with portions thereof broken away.

Referring now in detail to the drawing, there is shown therein a reel for holding pads 10—10 of copper tapes to be annealed, which pads are formed by winding the copper tapes upon collars 11—11, which project beyond the sides of the pads. The reel includes a solid arbor 12 on an end of which an open, spoked, reel head 13 is integrally formed. The reel head 13 is cast integrally with the arbor, and includes a hub portion 14, a plurality of spokes 15—15 and a rim 16. The arbor is provided with a bore 20 in the end thereof opposite to that to which the reel head 13 is formed, and a stud 21 is fastened to the arbor 12 by pins 22—22. The arbor is provided with a semi-annular slot 23 into which fits a semi-annular key 24 of a hub 25 formed integrally with an open, spoked reel head 30. The right end of the hub 25, as viewed in Fig. 1, is complementary to the left end of the arbor 12, and interlocks therewith to prevent relative rotation between the reel head 30 and the arbor, thereby positively preventing relative rotation between the two reel heads. A nut 31 is designed to be threaded on an elongated threaded portion 32 of the bolt to secure the reel head 30 in interlocking engagement with the arbor 12. The reel head 30 is provided with spokes 33—33 and a rim 34.

The collars 11—11 on which are formed the pads 10—10 fit slidably on the arbor 12 to mount the pads on the arbor. Branched spacers 35—35 positioned between shoulders 36 and 37 formed on the reel heads 13 and 30, respectively, and the end ones of the pads 10—10 serve to space the end pads from the reel heads. Branched spacers 40—40 identical with the spacers 35—35 but considerably thicker than the spacers 35—35 are interleaved with the pads 10—10 and space the pads from each other. The spacers 40—40 are made up of "L-shaped" bars 41—41 which are rigidly fastened to each other at bases 42—42 thereof, as illustrated more clearly in Fig. 2, and are also rigidly fastened to hubs 43—43. The hubs 43—43 are designed to fit slidably over the arbor 12 and project beyond the edges of the bars 41—41 to engage the collars 11—11 so that, unless slippage between the convolutions of tapes of the pads occur, there is no contact between the tape and the bars. If such slippage occurs in moving the reel, the bars limit it to a small amount, thereby insuring that the pads will not fall apart.

In the operation of the reel described hereinabove, the reel is positioned with the arbor 12 upright. One of the thin spacers is slid over the arbor, and the pads 10—10 and the thick spacers 40—40 are placed upon the arbor one at a time with the spacers 40—40 between the pads. One of the spacers 35—35 then is placed on the arbor next to the left hand pad, as viewed in Fig. 1. The reel head 30 is fitted over the stud 21, and is moved into interlocking engagement with the arbor 12, after which the nut 31 is threaded on the stud 21. The filled reel then may be tilted to rest upon the rims 16 and 34 of the reel heads 13 and 30, respectively, and be easily rolled into an annealing furnace. The diameter of the reel heads is greater than that of the pads 10—10 so that the pads are not damaged by contact with a floor or the like along which the reel is rolled. Since relative rotation between the reel heads is prevented, the reel may be easily rolled in desired directions. Since the faces of the pads are substantially uncovered they are subjected to direct contact with annealing gases as well as the peripheries thereof, and the wide spacing of the pads on the reel facilitates circulation of annealing gases therebetween. After the pads 10—10 have been annealed, they are removed from the annealing oven, the reel head 30 is removed from the arbor 12 and the pads 10—10 are removed.

The above-described reel serves to handle large numbers of pads 10—10 of tape in a facile manner without damage thereto during handling operations of the pads and the reel. The reel also provides large areas of the pads 10—10 to be contacted by annealing gases so that the annealing thereto may be very uniform from the inner peripheries of the pads to the outer peripheries thereof and may be completed relatively quickly with annealing gas at a lower temperature than has heretofore been possible to use. In addition to the foregoing advantages, the reel may be rapidly assembled and disassembled with little effort, and holds the convolutions of tape of each pad together.

What is claimed is:

A reel for holding pads of metallic tapes to be annealed, which comprises a drum, a head fixed to one end of the drum, a second head designed to be secured to the other end of the drum, said second reel head and said drum being designed to interlock to prevent relative rotation therebetween, and a plurality of spacers designed to fit over the drum, each of said spacers being provided with a plurality of divergent arms for contacting relatively small areas of the faces of the pads and a hub from which the arms extend substantially radially, said hubs projecting beyond the arms to contact the pads to tend to hold pads of tapes positioned on the drum out of engagement with the arms.

JOSEPH A. RUZGA.

REFERENCES CITED

The following references are of record in the file of this patent:

UNITED STATES PATENTS

| Number | Name | Date |
|---|---|---|
| 932,081 | Woodworth | Aug. 24, 1909 |
| 1,020,078 | Broden et al. | Mar. 12, 1912 |
| 1,103,519 | Lachman | July 14, 1914 |
| 1,461,736 | Prentiss | July 17, 1923 |
| 1,555,751 | O'Neil | Sept. 29, 1925 |
| 2,001,780 | Fry | May 21, 1935 |
| 2,062,016 | Serrurier | Nov. 24, 1936 |